US008880559B2

(12) United States Patent
Bartell

(10) Patent No.: US 8,880,559 B2
(45) Date of Patent: Nov. 4, 2014

(54) LOCATION ACTIVITY SEARCH ENGINE COMPUTER SYSTEM

(76) Inventor: Brian Bartell, San Diego, CA (US)

(*) Notice: Subject to any disclaimer, the term of this patent is extended or adjusted under 35 U.S.C. 154(b) by 577 days.

(21) Appl. No.: 12/753,820

(22) Filed: Apr. 2, 2010

(65) Prior Publication Data

US 2011/0246442 A1 Oct. 6, 2011

(51) Int. Cl.
| G06F 7/00 | (2006.01) |
| G06F 17/30 | (2006.01) |
| G06Q 10/00 | (2012.01) |
| G06Q 30/00 | (2012.01) |
| G06F 17/00 | (2006.01) |
| G06N 5/02 | (2006.01) |

(52) U.S. Cl.
CPC .................. *G06F 17/3087* (2013.01)
USPC ........... 707/802; 707/706; 707/709; 707/722; 707/723; 707/724; 707/736; 707/739; 707/748; 707/749; 707/769; 707/780; 705/5; 705/7.19; 705/7.33; 705/7.34; 705/26.7; 705/27.1; 706/46

(58) Field of Classification Search
None
See application file for complete search history.

(56) References Cited

U.S. PATENT DOCUMENTS

| 8,015,119 | B2 * | 9/2011 | Buyukkokten et al. ........ 705/319 |
| 2006/0122872 | A1 * | 6/2006 | Stevens et al. .................... 705/5 |
| 2007/0192116 | A1 * | 8/2007 | Lovitt ............................. 705/1 |
| 2009/0157664 | A1 * | 6/2009 | Wen ................................ 707/5 |
| 2011/0022312 | A1 * | 1/2011 | McDonough et al. ......... 701/209 |
| 2011/0106807 | A1 * | 5/2011 | Srihari et al. ................ 707/739 |

* cited by examiner

*Primary Examiner* — Ajay Bhatia
*Assistant Examiner* — Cheryl M Shechtman
(74) *Attorney, Agent, or Firm* — John Karl Buche; Buche & Associates

(57) ABSTRACT

A computer system that includes a computer that couples with a database. The computer includes program code or modules to gather location and activity content from disparate sources, and through text analytics, extract associations from the content and populate the database with the associations between locations and activities. Further modules provide end user interaction through presentation of a search user interface specific to locations and activities. Additional modules provide the capability to search the database, rank the results of the search and present the results to the user.

28 Claims, 23 Drawing Sheets

FIG. 9

FROM: http://myroatan.blogspot.com/2009/09/pigeon-cay-one-of-top-10-places-to.html
TUESDAY, SEPTEMBER 22, 2009

Pigeon Cay: one of top 10 spots to snorkel

*Coastal Living Magazine* has included Pigeon Cay in its list of top ten spots to snorkel! The popular Pigeon Cay excursion is offered by Paya Bay Resort, Roatan, Honduras.

Posted by Davinci McNab at 11:43 AM

FIG. 10A

Location word forms table (one entry for each orthographic form of each location synonym)
Three example word forms: Paris (France), Paris (Texas), and Hope (Arkansas)

| Record ID | 4580066 |
|---|---|
| Location Lemma ID | 859852 (Paris, France) |
| Syn | Paris |
| capsHomographs | PARIS |
| nameType | Primary_ascii |
| wikiTerm | Paris |
| wikiExact | True |
| capsFreq | 35 |
| commonFreq | 80 |
| commonHomographs | Paris |
| wikiTitle | Paris |

| Record ID | 4580064 |
|---|---|
| Location Lemma ID | 2544347 (Paris, Texas) |
| Syn | Paris |
| capsHomographs | PARIS |
| nameType | Primary_ascii |
| wikiTerm | Paris |
| wikiExact | False |
| capsFreq | 35 |
| commonFreq | 80 |
| commonHomographs | Paris |
| wikiTitle | Paris, Texas |

| Record ID | 3702002 |
|---|---|
| Location Lemma ID | 2468467 (Hope, Arkansas) |
| Syn | Hope |
| capsHomographs | HOPE |
| nameType | Primary_ascii |
| wikiTerm | Hope |
| wikiExact | False |
| capsFreq | 35 |
| commonFreq | 10 |
| commonHomographs | [hope,Hope] |
| wikiTitle | Hope, Arkansas |

FIG. 10B

Location lemmas (one entry for each geographic location)
Three example lemmas (referenced by word forms above): Paris (France), Paris (Texas), and Hope (Arkansas)

| Record ID | 859852 |
|---|---|
| fclass | P |
| wikiTerm | Paris |
| timezone | Europe/Paris |
| altname | [Lungsod ng Paris, Lutece, Lutetia Parisorum, Paarys, Paname, Pantruche, PAR, Paräis, Páras, Pari, Paries, Pariggi, Parigi, Pariis, Pariisi, Parijs, París - Paris, Parisi, Pariz, Par?ze, Parizo, Párizs, Parys, Pary?, Paryžius, Ville-Lumière, ...] |
| Parent ID | 74966 (Paris 4th level Administrative Region) |
| name | Paris |
| gtopo30 | 30 |
| wikiExact | true |
| fcode | PPLC |
| lat | 48.8534100 |
| lon | 2.3488000 |
| population | 2138551 |
| country | FR |
| wikiTitle | Paris |

| Record ID | 2544347 |
|---|---|
| fclass | P |
| wikiTerm | Paris |
| timezone | America/Chicago |
| Parent ID | 154040 (Lamar County, TX) |
| name | Paris |
| gtopo30 | 182 |
| wikiExact | false |
| fcode | PPL |
| lat | 33.6609389 |
| lon | -95.5555130 |
| population | 27022 |
| elevation | 183 |
| country | US |
| wikiTitle | Paris, Texas |

| Record ID | 2468467 |
|---|---|
| fclass | P |
| wikiTerm | Hope |
| timezone | America/Indiana/Knox |
| Parent ID | 142560 (Hempstead County, Arkansas) |
| name | Hope |
| gtopo30 | 106 |
| wikiExact | false |
| fcode | PPL |
| lat | 33.6670616 |
| lon | -93.5915665 |
| population | 10382 |
| elevation | 107 |
| country | US |
| wikiTitle | Hope, Arkansas |

Hierarchically organized travel-related activity terms and synonyms.

FIG. 12

Common terms (from SCOWL - http://wordlist.sourceforge.net/)

| Record ID | Syn | Frequency |
|---|---|---|
| 120663 | Hope | 10 |
| 191159 | PARIS | 35 |
| 154801 | LOS ANGELES | 85 |

Wiki non-geo terms that orthographically overlap location terms

| Record ID | Syn | Wiki ID |
|---|---|---|
| 977748 | Paris Hilton | Paris Hilton (fragrance) |
| 535595 | H.O.P.E. | H.O.P.E. |
| 577063 | Hope Diamond | Hope Diamond |

FIG. 13

| URL | Site | Last Fail | Last OK | Depth | CType | Charset |
|---|---|---|---|---|---|---|
| http://www.lahainadivers.com/content/dive-turtle-reef-with-lahaina-divers | lahainadivers.com | 10-2-2009 | 1-13-2010 | 2 | text/html | ISO 8859-1 |
| http://www.turtlereefdivers.com/ | turtlereefdivers.com | | 1-11-2010 | 1 | text/html | ISO 8859-1 |
| http://www.sailtrilogy.com/pages/scubadiving.php | sailtrilogy.com | 10-3-2009 | | 2 | text/html | ISO 8859-1 |

For each URL that was successfully fetched (LastOK != empty), the full fetched data (along with zero or more archived previous instances of the fetched data) is stored in a zip file indexed by the URL string.

FIG. 14A

Extraction rules implement capabilities well know in the art of information extraction, as explicated in "Speech and Language Processing", Daniel Jurafsky and James H. Martin, Prentice Hall 2009.

In our embodiment, extraction rules are comprised of a sequence of text analytic processes applied to each page of text. Each process annotates the text with relevant regions and/or identifies features or evidence of the regions that are predictive of their semantic interpretation. Rules also may combine regions and evidence to create additional regions and/or evidence. Numeric weights and confidences may be associated with rules, regions, and interpretations.

The rule set is represented in a high level language that combines features of: dictionary lookup, regular expressions with non-regular embedded functions, call-out functions implemented in the java programming language, domain data types, and disambiguation via weighted evidence combination.

An example rule set is depicted below in beginning in FIGS. 14B and continuing through 14D:

FIG. 14B

```
<defs reflags="x">
  <defs>

<function name="termToConcepts"
class="com.notiora.ted.matchfunc.util.TermToConcepts"/>

<!-- Standard synonyms -->

<matcher name="dict.travsyn" bean="travsynDict"/>
    <matchkey key="travsyn.term" wrap="false"> dict.travsyn.term
</matchkey>

<!-- Dictionaries -->

<matcher name="dict.travel" bean="travelDict"/>
    <matcher name="dict.geopred" bean="geopredDict"/>
    <matcher name="dict.geocommon" bean="geoCommonDictSingle"/>
    <matcher name="dict.geo" bean="geoDictSimpleTerm"/>
    <matcher name="dict.nongeo" bean="nonGeoDict"/>

<!-- Score non-geo dictionary terms -->

<matcher bean="nongeoTermScoreMatcher" name="nongeo"
keys="dict.nongeo.term" termKey="syn" wtPfx="nongeo."/>
    <matcher bean="geocommonTermScoreMatcher" name="geocommon"
keys="dict.geocommon.term" termKey="syn" freqKey="freq"
wtPfx="geocommon."/>
```

FIG. 14C

```
<matcher bean="geopredTermScoreMatcher" name="geopred"
keys="dict.geopred.term" termKey="wikiTitle" wtPfx="geopred."/>
    <matcher bean="travelTermScoreMatcher" name="travel"
termKey="syn" wtPfx="travel." keys="dict.travel.term"/>

<!-- Promote Geos to concept where sufficient evidence  -->

<matcher bean="geoTermToConceptsMatcher" filter="false"
name="t2c" key="geo.concept" keys="dict.geo.term"/>
    <matcher bean="geoPredToConceptsMatcher" name="p2c"
key="geo.concept" keys="dict.geopred.term"/>
    <matcher bean="geoConceptScoreMatcher" name="csc"
keys="geo.concept"/>

<!-- typedefs -->

<typedef key="geo.concept"> <prop key="geolocuid"
type="Integer" dictBean="geoDict"/> </typedef>
    <typedef key="travel.concept"> <prop key="oboid"
type="String" dictBean="travelDict"/> </typedef>
    <typedef key="geocommon.concept"> <prop key="syn"
type="String"/> </typedef>
    <typedef key="nongeo.concept"> <prop key="syn"
type="String"/> </typedef>

<!-- Pick top concepts -->

<matchkey key="geocommon.concept" wrap="false">
dict.geocommon.term </matchkey>
    <matchkey key="nongeo.concept" wrap="false">
dict.nongeo.term </matchkey>
    <template key="travel.concept" substrings="true"
allmatches="true" mergedup="false"> $(dict.travel.term) (?{
toexport=termToConcepts(matches[0]) }) </template>

<matcher bean="keepBestMatcher" key="top.phrases"
storePfx="top."
        keys="geocommon.concept, geo.concept, nongeo.concept,
travel.concept"/>

<!-- images -->

<matcher bean="standardImageScoreMatcher"
key="img.candidate" keys="html.img"/>
```

FIG. 14D

```
    <!--  find geo / activity pairs  -->

<matchkey key="top.travel.concept.term.activity"
wrap="false"> top.travel.concept[ type="activity" ] </matchkey>
    <matchkey key="top.travel.concept.term.none" wrap="false">
top.travel.concept[ type="none" ] </matchkey>
    <matchkey key="top.travel.concept.term.quality"
wrap="false"> top.travel.concept[ type="quality" ] </matchkey>

<matcher bean="associatedPairsMatcher"
key="travel.fact.candidate" proximityChars="150"
matchChars="300"
        pairKeys="top.geo.concept,
top.travel.concept.term.activity" pairAttrs="geoloc, activity"/>

<template name="fact.options"
within="travel.fact.candidate">^ (?{
        within.quality =
unwrap(allMatches("top.travel.concept.term.quality")) ;
        within.image = unwrap(allMatches("img.candidate")) ;
        within.none =
unwrap(allMatches("top.travel.concept.term.none")) ;
        true })
    </template>

<matcher bean="featureCountScoreMatcher"
key="travel.fact.scored" keys="travel.fact.candidate"
        optCount="1" features="geoloc,activity,quality,image"/>

<matchkey key="travel.fact" wrap="false"> travel.fact.scored
</matchkey>

</defs>
</defs>
```

FIG. 15

Each location/activity association is a single activity and single location extracted from a snippet of text (from a page), along with optional image, modifiers, and sentiment. In addition to the data shown here, other information such as the date the page was fetched, the date information was extracted, html tags or markup in the snippet, and confidence score for each extraction may also be stored.

| URL | Snippet | Activity | Location | Image | Modifiers | Sentiment |
|---|---|---|---|---|---|---|
| http://www.cameorose.com/wi-stateparks.html | acres, spectacular views, 500-foot cliffs, miles of hiking (lower lake and upper bluff trails), mountain bike trails, great rock climbing and two beaches. Park is near Baraboo, WI in Sauk County. 608-356-8301. | Rock climbing | 2601288 (Baraboo, WI, USA) | | | great |
| http://www.destination-nz.com/listing/s-c28-d-e0-pg1-k2/d-l181/Zorb%20Rotorua.html | Zorb Rotorua - Zorbing in Rotorua, New Zealand Activities, Activities in Rotorua Visitor Guide Trade Blog Forum destination-nz.com - New Zealand Travel Guide | Zorbing | 1789729 (Rotorua, NZ) | | | |
| http://www.alaskatravel.com/alaska-adventure | Home Packages Hotels Transportation Day Tours Cruises Reservations Brochure Contact Us Alaska Adventure Sea kayaking with Orcas from Seward Are you looking for Alaska adventure? Alaska Tour & Travel is here to help you find the Alaska adventure that is perfect for you. How abo | Sea kayaking | 2586166 (Seward, AK) | http://www.alaskatravel.com/photos/kayak1.jpg | Orcas | perfect |

FIG. 16A

Each travel fact exemplar is a snippet of text from a page, along with human editor assessments of the validity of all key extractions: act/loc associations, activities, locations, images, modifiers, and sentiments. In addition to the data shown here, other information such as the date of assessment, html tags or markup in the snippet, or the identity of the editor may also be stored. In the table, + indicates the extraction is valid, - indicates the extraction is incorrect.

| URL | Snippet | Assoc | Activities | Locations | Images | Modifiers | Sentiments |
|---|---|---|---|---|---|---|---|
| http://www.cameorose.com/wi-stateparks.html | acres, spectacular views, 500-foot cliffs, miles of hiking (lower lake and upper bluff trails), mountain bike trails, great rock climbing and two beaches. Park is near Baraboo, WI in Sauk County. 608-356-8301. | + | +Rock climbing | +2601288 (Baraboo, WI, USA) | | | +great +spectacular |
| http://www.destination-nz.com/listing/s-c28-d-e0-pg1-k2/d-l181/Zorb%20Rotorua.html | Zorb Rotorua - Zorbing in Rotorua, New Zealand Activities, Activities in Rotorua Visitor Guide Trade Blog Forum destination-nz.com - New Zealand Travel Guide | + | +Zorbing | +1789729 (Rotorua, NZ) +489340 (New Zealand) | | | |

FIG. 16B

| URL | Snippet | Assoc | Activities | Locations | Images | Modifiers | Sentiments |
|---|---|---|---|---|---|---|---|
| http://www.alaskatravel.com/alaska-adventure | Home Packages Hotels Transportation Day Tours Cruises Reservations Brochure Contact Us Alaska Adventure Sea kayaking with Orcas from Seward Are you looking for Alaska adventure? Alaska Tour & Travel is here to help you find the Alaska adventure that is perfect for you. How abo | + | +Sea kayaking | +2586166 (Seward, AK) +478239 (Alaska) -2623232 (Contact, Elko County, Nevada) -2630902 (Orcas, San Juan County, WA) | +http://www.alaskatravel.com/photos/kayak1.jpg | +Orcas | +perfect |

Depicted below is an example of an initial page, where the user starts his or her search. The user may type in one or more locations or activities, or may selection activities or locations from a hierarchically organized set of options.

Depicted below is an example of a result page, in which a map of a relevant set of locations is presented along with icons indicating the type of activity.

LOCATION ACTIVITY SEARCH ENGINE COMPUTER SYSTEM

BACKGROUND OF THE INVENTION

1. Field of the Invention

One or more embodiments setting forth the ideas described throughout this disclosure pertain to the field of computer systems. More particularly, but not by way of limitation, one or more aspects of the disclosure enable a location activity search engine computer system that is configured to populate a database and provide search results from the database that include locations having desired activities and/or activities at desired locations.

2. Description of the Related Art

Travel recommendation search engines exist, however current implementations are extremely limited in the number of recommendations and destinations that are involved. For example, some recommendation engines associated with travel related websites are limited to the top 30 destinations and have only a few categories of general activities, e.g., "Night Life", "Nature", "Sports", "Museums". The resulting coarse granularity of destinations and recommendations does not provide a useful amount of information for detailed searching that many travelers desire. Hence, users are currently unable to see the true breadth, depth or variety of locations and activities that are associated with one another. For example, with current recommendation search engines, there is no way to find a comprehensive ranked list of the best surfing locations in an arbitrary country.

At the other end of the spectrum, a standard web search engine provides a very large amount of information associated with locations and activities. The information that is returned is unstructured however. The search results obtained from a standard web search engine do not describe what activities are available at a location, or what locations are best for an activity. The search results only show pages that contain the text that is used to search, whether relevant or not. For example, a search for "brazil surfing" returns 3,400,000 web pages from one such standard web search engine. Hence, a user cannot easily find the most relevant location and activity associations over the millions of web pages that include the search results returned from the search engine.

The problems with currently known travel related websites and search engines are many. Currently known travel related websites currently do not list a large number of specific locations, for example all of the surf spots in Brazil, since only the top 30 or so destinations in the world are provided as locations. In addition, surfing is generally not an activity that is listed in the short list of general categories of activities that are provided for selection on the websites. As opposed to currently known travel related websites, the standard search engines accessible over the Internet are incapable of providing a ranked list of surf spots in Brazil since so much raw data is provided as a result of the search. Although a user may be able to find a specific Internet blog where users discuss surfing, the user would have to wade through enormous amounts of information on various blogs to find information relevant to the best surf spots in a general location like Brazil. The user is in effect forced to create a ranked list themselves through a lengthy web page and blog research effort for example to find specific locations within Brazil to surf. The user must decide which websites or blogs rank the highest in relevancy in some ad hoc manner. The ranking is generally based on only a fraction of the reviews that exist throughout the Internet. Hence, there is no known solution that provides an intelligent ranked association of locations and activities that are of interest to a user.

Since there are no known solutions that provide intelligent ranked associations of locations and activities, there likewise are no solutions that take this approach a step further to provide search results having finer grained facets of locations such as searching for locations and activities with particular related parameters (e.g., weather), such as touring a monastery when the chance of snowfall is low, or in a country with no adverse travel advisories, or where a particular language is spoken, or where the cost of living is low, or where the crime rate is low. Likewise, there is no solution known that allows for facets of activities to be searched for, such as the particular types of fish or other creatures that are viewable when snorkeling, or the particular type of museum, i.e., modern, renaissance, etc., that are available for touring.

Although there are numerous sources of information that are related to travel that include associations between locations and activities, there is no known system that gathers documents from a vast array of sources, extracts associations between locations and activities and stores the associations in a database. Furthermore, there is no known system that provides searching and ranking of results obtained from this specific location and activity database. For at least the limitations described above there is a need for a location activity search engine computer system.

BRIEF SUMMARY OF THE INVENTION

At a high-level the disclosure set forth herein is directed to a location activity search engine computer system. Embodiments of the system enable a computer system that is configured to populate a database and provide search results that include locations having desired activities and/or activities at desired locations. Embodiments of the system allow users to easily search for and find ranked lists of associations between locations and activities. There are many approaches for implementing such a system and its related methods that are elaborated on throughout this disclosure.

One or more embodiments may be implemented with hardware that hosts a database and with computer hardware that is coupled with the database and which includes program code in the form of modules. Any design methodology may be utilized to implement a design for embodiments of the invention including but not limited to object oriented design. Any programming language may be utilized to implement the program code of the modules including any high level language, assembly language or microcode. The modules are configured to gather content related to locations and activities from a variety of disparate sources, extract associations between locations and activities from the content and populate the database with the associations. Additional modules are configured to provide end user interaction through presentation of a search user interface specific to locations and activities and are configured to search the database for locations and activity associations, rank the results of the search and present the results to the user.

One or more embodiments of the system process a large set of natural language documents, for example Internet web pages, Internet blogs and Internet reviews. Embodiments of the system identify associations in the text between geographical locations, for example "Lhasa, Tibet" and activities such as tourism activities at those geographical locations, for example "touring a monastery". In one or more embodiments, Named Entity Disambiguation (NED) is utilized to find the locations and activities, and linguistic and structural clues are utilized to find associations between locations and activities. The associations are extracted and placed in a database for ranking Embodiments of the system allow users to find a wide array of activities at locations that they are interested in, and/or find locations that are associated with activities that they are interested in.

From a high level view, there are two stages associated with the system. Population of the database and access of the database. These phases may occur one after the other or in parallel for embodiments that evolve over time for example.

The population of the database is performed via program code associated with a dictionary module, information collection module and extraction module. These modules are implemented with program code that executes on one or more computers associated with the database in one or more embodiments of the system.

The dictionary module is configured to obtain geographical locations or "geolocs", either from known databases or websites or any other source of location information accessible via the computer. The locations are augmented with synonyms and the locations are associated with related locations, points of interest and terminology. The dictionary module is further configured to obtain activities either manually or from any other source of information including online dictionaries for example. The activities are augmented with modifiers and facets related to the activities. The activities, modifiers, and facets are enumerated with synonyms and related terminology. The result of the development of the dictionary of locations and activities provides the scope of the embodiment that is enabled by the dictionary module.

The information collection module is configured to gather documents associated with the locations and activities as determined by the dictionary module. One implementation of an embodiment of the information collection module is configured to utilize standard search engines to find candidate Internet web pages related to the locations and activities. In addition, the information collection module is configured in one or more embodiments to determine popular travel domain names and curate as necessary to reduce the size of content. The curation is configurable and implementations of one or more embodiments may favor completeness over total cost for example. The information collection module is configured in one or more embodiments to web crawl travel domains and associated web pages to find candidate Internet web pages. The candidate Internet web pages may include standard web pages, or may be associated with blogs, feeds (twitter, news, etc), travel literature, or reviews for example.

The extraction module is configured to extract location and activity associations from the text associated with the candidate Internet web pages. One or more embodiments of the extraction module may identify and disambiguate locations in the text and disambiguate activities in the text. The extraction module may also identify probable associations between the locations and activities based on sentence structure, verb connectors and page structure. The extraction module may also identify the sentiment of the association, i.e., neutral, degrees of positive or negative opinion. The extraction module is also configured to populate the database and store each association in the database indexed by location, activity and page web domain for example. The extraction module may also be configured to calculate summary statistics such as measures of aggregate association between locations and activities. The extraction module may utilize standard Online Analytical Processing for this purpose.

The access of the database is performed via program code associated with a user interface module, search module and rank module. The search and rank modules may be implemented separately or in a combined manner. These modules are implemented with program code that executes on the computer associated with the database in one or more embodiments of the system.

The user interface module is configured to present a search user interface to a user and retrieve a query from the user. For example, an interface element having one or more location and/or activity text fields or menu lists may be presented to the user. Optionally, modifiers and/or facets may be presented for user selection as well.

The search module is configured to search the database for any locations entered or any activities entered. If for example a large geographic area is selected by the user, e.g., "California", then the search module finds locations within the large geographic area that are associated with the activities, i.e., "La Jolla", "Del Mar", etc. If the location selected or entered by the user is a fine grained location, then the activities inquired about are searched for in association with that location. If the user enters no locations, then a search is conducted by the search module for locations having associations with the desired activities. If the user enters no activities, then for each location obtained from the user, if the location is a large geographic area, then a search is conducted by the search module for activities in the large region to find locations within that large region where the activities may occur. If the location is a fine grained location, then activities associated with that location are searched for.

The rank module is configured to rank the association results that are found by the search module. The results may be ranked based on any desired factors such as frequency of association, i.e., the number of different times the association was found in the text), domain frequency of the association (the number of different domains where the association was found), aggregate sentiment of the association (neutral, positive/negative sentiment related to the association as determined by the text), overall frequency and domain frequency of the location and activity in the association, or combinations of the above and/or other factors. In one or more embodiments, based on the desired factors, different rankings may be produced such as popular associations (most frequent and positive associations) and fringe associations (highly positive associations that are infrequent).

The user interface module is further configured to present the ranked list of the associations to the user, for example via a graphical user interface having a search user interface element. The search interface element may be implemented as a map, table or list for example or with any other user interface element capable of displaying the associations to the user. In one or more embodiments, the activities may be displayed as icons on the map, and/or with a list of locations and activities with specific text from which the association was extracted, with a hyperlink to the original content where the association was extracted.

BRIEF DESCRIPTION OF THE DRAWINGS

The above and other aspects, features and advantages of the ideas conveyed through this disclosure will be more apparent from the following more particular description thereof, presented in conjunction with the following drawings wherein:

FIG. 9 illustrates an embodiment of a web page and blog containing locations and activities.

FIG. 10A illustrates an embodiment of the location data set.

FIG. 10B illustrates three location lemmas associated with the location data set.

FIG. 12 illustrates an embodiment of the other data set.

FIG. 13 illustrates an embodiment of the travel content data set.

FIGS. 14A, 14B, 14C, and 14D (collectively "FIG. 14") illustrate an embodiment of the extraction rules data set.

FIG. 15 illustrates an embodiment of the location activity association database.

FIGS. 16A, 16B (collectively "FIG. 16") illustrate an embodiment of the travel fact exemplars database.

DETAILED DESCRIPTION

A location activity search engine computer system will now be described. In the following exemplary description numerous specific details are set forth to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
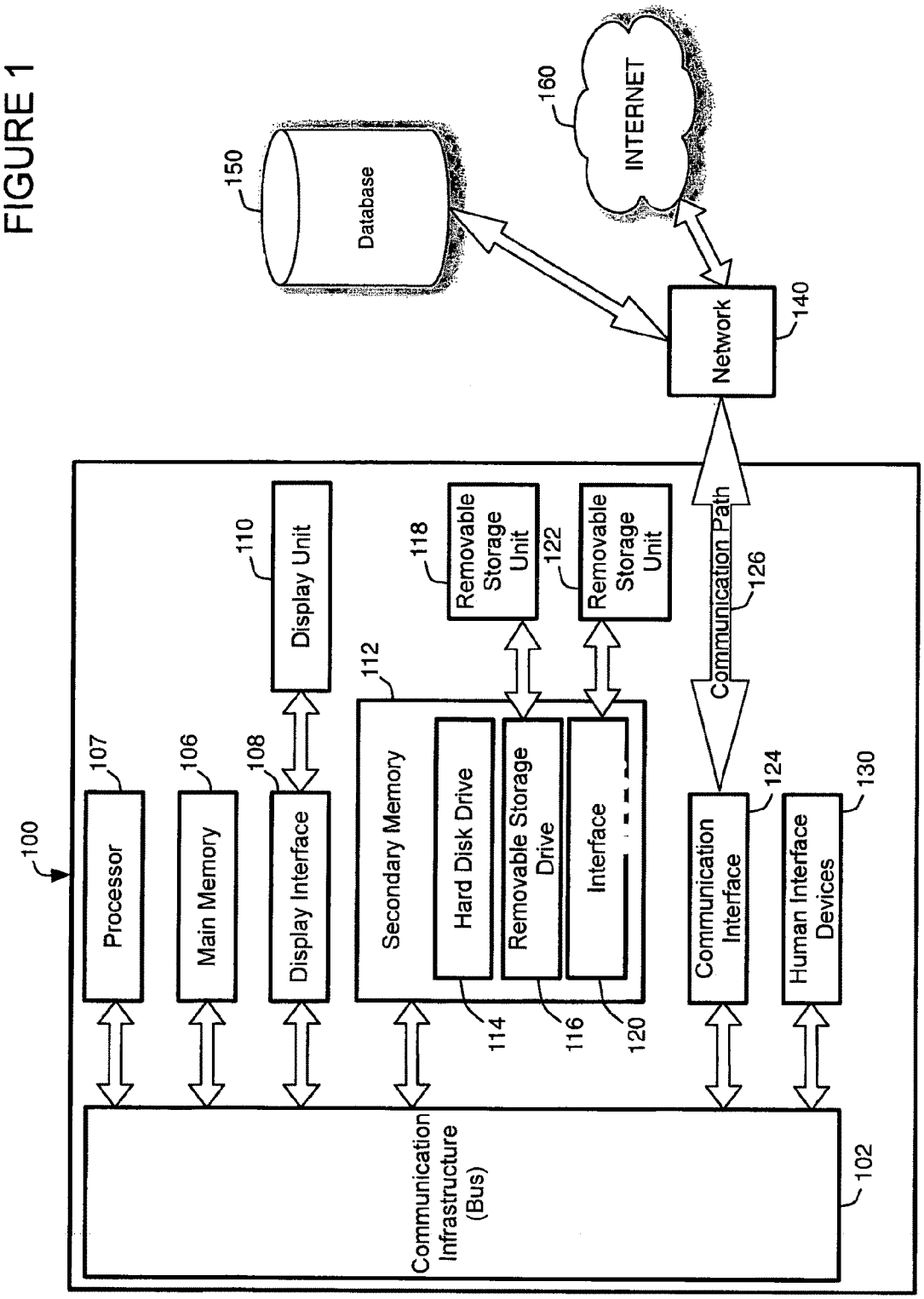
FIG. 1 illustrates a hardware architecture diagram of the system including a database and one embodiment of a computer configured to execute program code or modules.

FIG. 1 is provided for purposes of illustrating a general-purpose computer 100 and peripherals which, when programmed as described herein, may operate as a programmed computer capable of implementing one or more methods, apparatus and/or systems directed to the ideas described throughout this disclosure. Processor 107 may be coupled to a bi-directional communication infrastructure such as Communication Infrastructure System Bus 102. Communication Infrastructure 102 may generally be a system bus that provides an interface to the other components in the general-purpose computer system such as Processor 107, Main Memory 106, Display Interface 108, Secondary Memory 112 and/or Communication Interface 124. The invention may also operate on a set of networked computers, performing various steps herein in parallel.

Main memory 106 may provide a computer readable medium for accessing and executing stored data and applications. Display Interface 108 may communicate with Display Unit 110 that may be utilized to display outputs to the user of the programmed computer system. Display Unit 110 may comprise one or more monitors that may visually depict aspects of the computer program to the user. Main Memory 106 and Display Interface 108 may be coupled to Communication Infrastructure 102, which may serve as the interface point to Secondary Memory 112 and Communication Interface 124. Secondary Memory 112 may provide additional memory resources beyond main Memory 106, and may generally function as a storage location for computer programs to be executed by Processor 107. Either fixed or removable computer-readable media may serve as Secondary Memory 112. Secondary Memory 112 may comprise, for example, Hard Disk 114 and Removable Storage Drive 116 that may have an associated Removable Storage Unit 118. There may be multiple sources of Secondary Memory 112 and systems described in this disclosure may be configured as needed to support the data storage requirements of the user and the methods described herein. Secondary Memory 112 may also comprise Interface 120 that serves as an interface point to additional storage such as Removable Storage Unit 122. Numerous types of data storage devices may serve as repositories for data utilized by the programmed computer system detailed in FIG. 1. For example, magnetic, optical or magneto-optical storage systems, or any other available mass storage technology that provides a repository for digital information may be used.

Communication Interface 124 may be coupled to Communication Infrastructure 102 and may serve as a conduit for data destined for or received from Communication Path 126. A Network Interface Card (NIC) is an example of the type of device that once coupled to Communication Infrastructure 102 may provide a mechanism for transporting data to Communication Path 126. Network 140 may be implemented with any type of Local Area Network (LAN), Wide Area Network (WAN), Wireless network, optical network, distributed network, telecommunications network or any combination thereof. One or more embodiments of the invention interface via network 140 with Internet 160.

To facilitate user interaction with the programmed computer system, one or more Human Interface Devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to Processor 107 to trigger one or more responses from the specially programmed computer are within the scope of the systems and methods described throughout the disclosure.

While FIG. 1 depicts a physical device, the scope of the systems and methods set forth herein may also encompass a virtual device, virtual machine or simulator embodied in one or more computer programs executing on a computer or computer system and acting or providing a computer system environment compatible with the methods and processes implementing the disclosed ideas. Where a virtual machine, process, device or otherwise performs substantially similarly to that of a physical computer system of the invention, such a virtual platform will also fall within the scope of a system of the disclosure, notwithstanding the description herein of a physical system such as that in FIG. 1.

Figure 2:
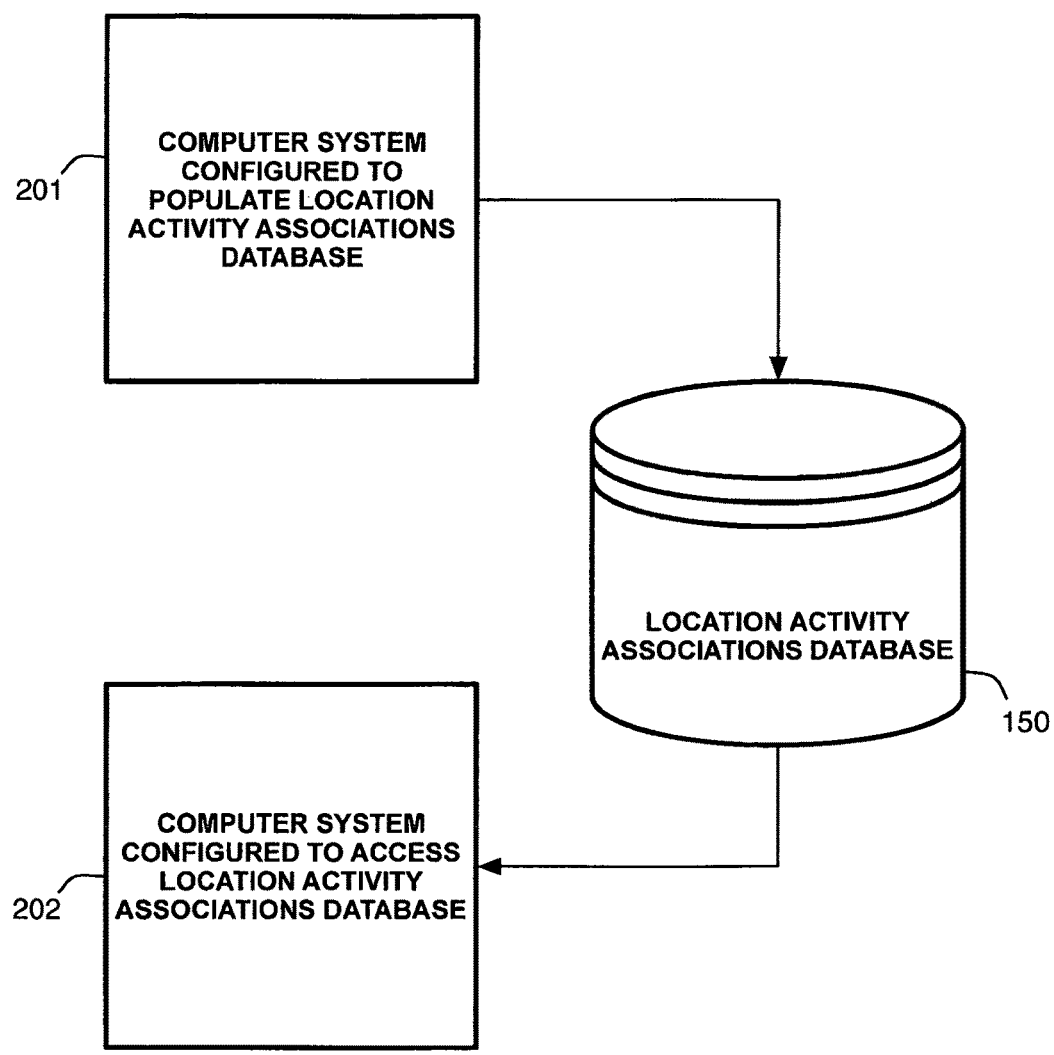
FIG. 2 illustrates an overview of the data flow of the system.

FIG. 2 illustrates an overview of the data flow of the system. From a high level view, there are two main data flow stages that occur in the system. The two main stages are the population of the database data flow stage 201 and access of the database data flow stage 202. These data flow stages may occur one after the other, or in parallel for embodiments that evolve over time for example. These data flow stages involve the flow of data into and out of the system and are implemented in one or more embodiments with the computer system 100, database 150 (which may also reside on hard disk drive 114), network 140 and Internet 160 as illustrated in FIG. 1 and as implemented in various modules that are detailed below.

Figure 3:
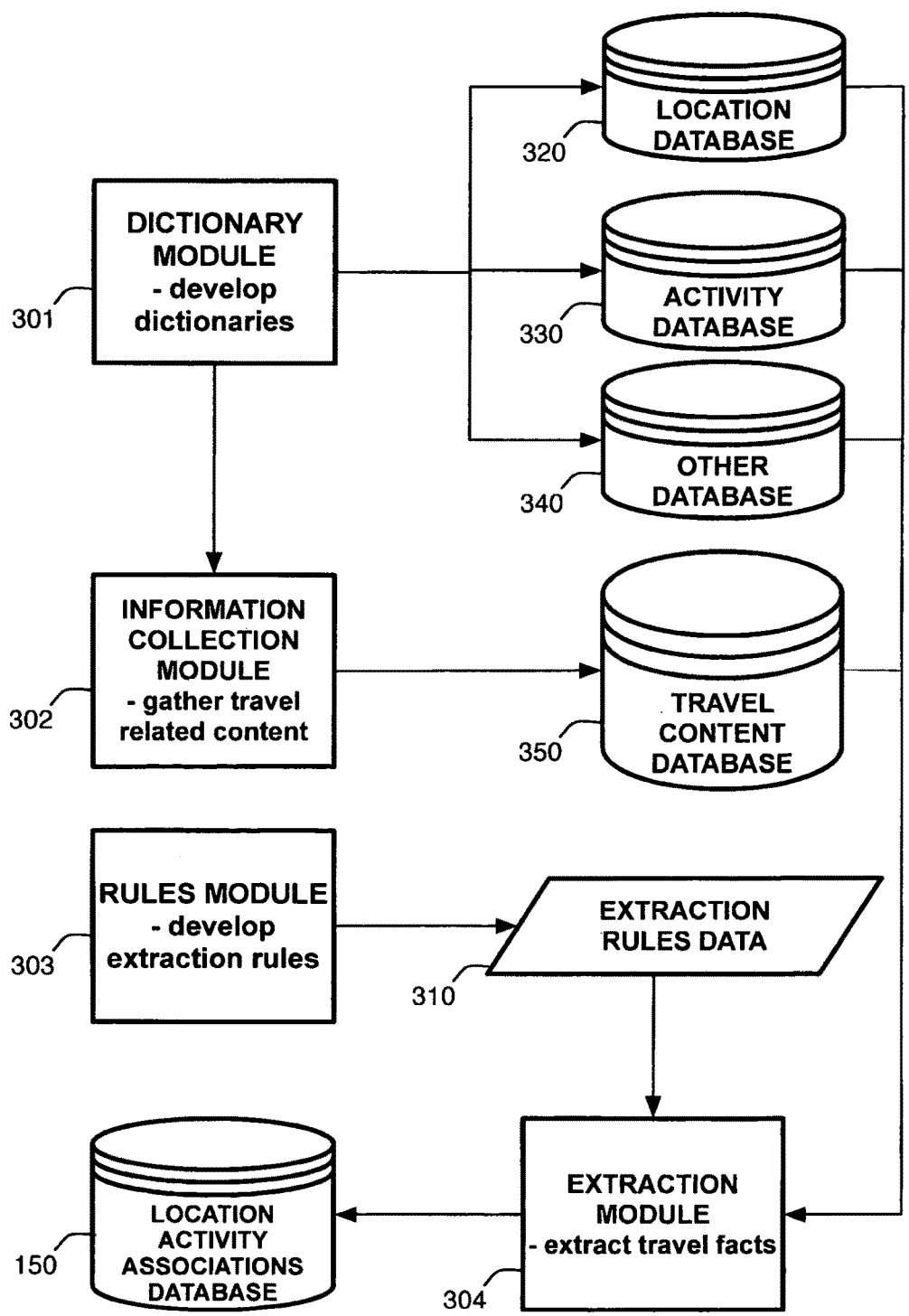
FIG. 3 illustrates a finer grain view of the data flow of the system with respect to FIG. 2.

FIG. 3 illustrates a finer grain view of the data flow of the system with respect to FIG. 2, specifically with respect to the population of the database data flow stage 201. The population of the database is performed via program code associated with dictionary module 301, information collection module 302, rules module 303 and extraction module 304. These modules are implemented with program code that executes on computer 100 associated with database 150 which is also known as location activity associations database 150 in one or more embodiments of the system. Also shown in FIG. 3 are extraction rules 310, location data set 320, activity data set 330, other data set 340, travel content data set 350 and location activity associations database 150. Extraction rules data set 310, location data set 320, activity data set 330, other data set 340 and travel content data set 350 may be implemented as tables within the same database as location activity associations database 150, or may be located in computer memory or another database or individual databases or file systems or any other object that stores data.

Dictionary module 301 stores data associated with locations in location data set 320, data associated with activities in activity data set 330, and other data in other data set 340. Location data may include information other than a name and coordinate, such as climate, logistical and/or historical or other content associated with locations. Climate related data may include monthly temperature values, amount of snow/rain/cloudy/sunny days, or any other characteristic associated with climate. Logistical data may include information such as languages spoken, cost of living, accessibility, transportation, crime/theft rate, murder/assault rate, travel advisories, peak season/off season date ranges. Activity data may include any type of activity that the system is targeted for and may include any activity that humans undertake. Detailed activity facets are associated with the activity data. Facets may include information such as the type of art, (modern, renaissance, etc.,) that is related to a museums activity, or type of creatures in a given location, so that the user may search for locations by entering "snorkeling with sea turtles" into the system for example. Other detailed activity facets may include time periods, cultures, religions or type of flora and fauna related to activities and/or locations. Other data set 340 may include geographically ambiguous words for example.

Information collection module 302 gather documents associated with the locations and activities as determined by the dictionary module in conjunction with location data set 320, activity data set 330 and other data set 340 and store the documents in travel content data set 350.

Rules module 303 enables entry and optimization of extraction rules into extraction rules set 310 which is utilized by extraction module 304 along with data sets 320, 330, 340 to extract location and activity associations from the text associated with documents in travel content data set 350 in order to produce the location activity associations database 150. The rules module is further described in detail with respect to FIG. 6 below. The extraction module is further described in detail with respect to FIG. 7 below. The location activity associations database 150 is utilized by the system to present a query user interface and present results of the search as detailed with respect to FIG. 8 below.

Figure 4:
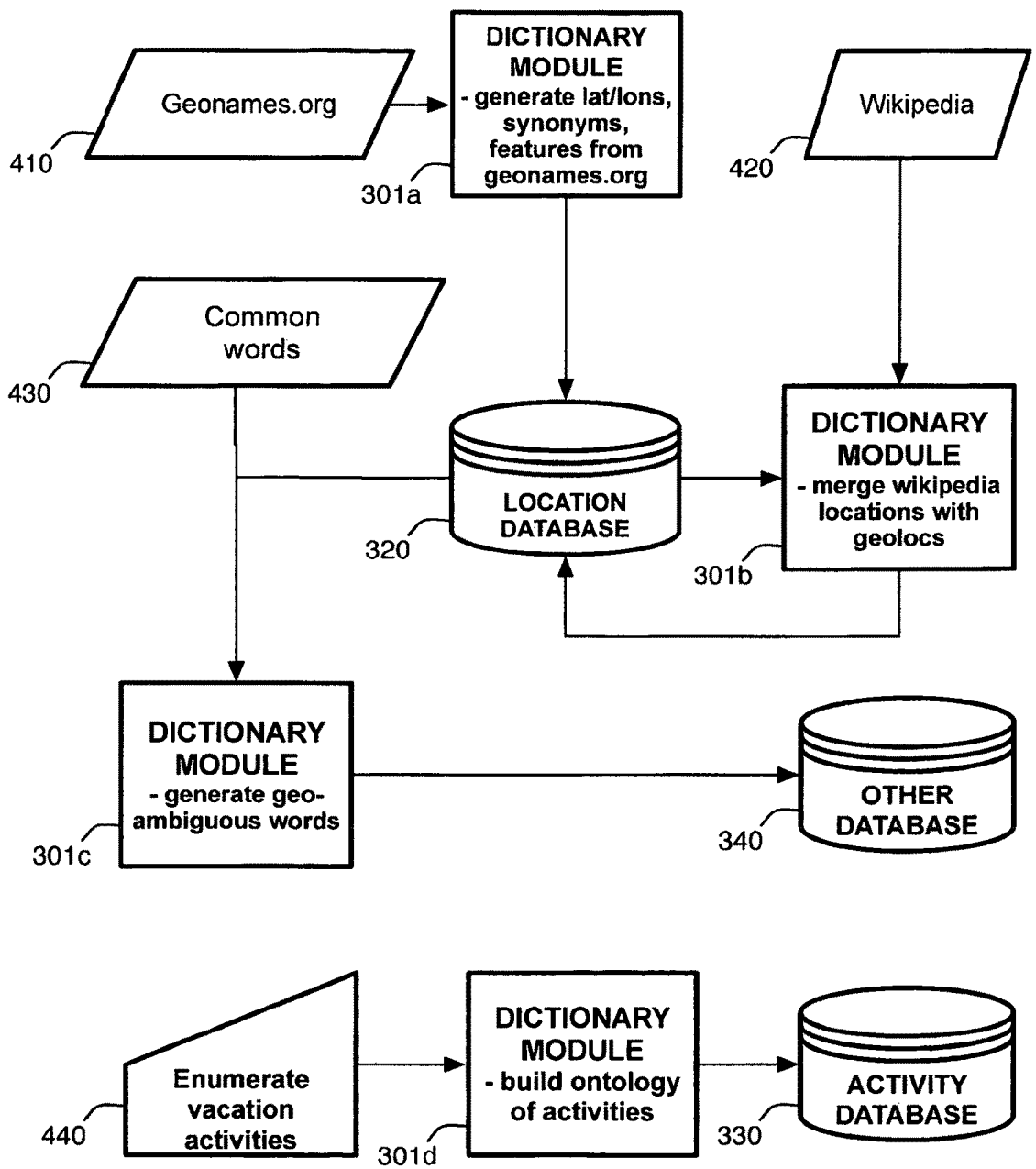
FIG. 4 illustrates the data flow of the dictionary module of FIG. 3.

FIG. 4 illustrates the data flow of the dictionary module of FIG. 3. Dictionary module 301 as shown in FIG. 3 includes dictionary sub module 301a. Dictionary sub module 301a is configured to obtain geographical locations or "geolocs", either from known databases or websites, such as website 410, as accessed by computer system 100 over Internet 160 or any other source of location information accessible via computer system 100. Geoloc data may also be enhanced manually, by adding new location entries and/or relationships between entries, deleting location entries, or by updating attributes associated with location entries. Website 410 for example may include geonames.org or any other Internet location that includes locations. The locations are stored in location data set 320. For example, a location "Hempstead County" is stored in the location data set; it is contained within location "Arkansas", and contains other locations such as the city of "Hope"; data associated with "Hempstead County" includes latitude, longitude, kind of location ("2nd level administrative region"), and approximate population. The locations are augmented with synonyms and features via dictionary sub module 301a and the locations are associated with related locations, points of interest and terminology including common words set 430. Dictionary sub module 301b is configured to obtain locations from any other Internet websites, blogs or reviews and merge the results into location data set 320. For example, the wikipedia article on "Hope, Arkansas" can be associated with the geoloc "Hope" in "Hempstead County" via name, location, and other evidence in the wikipedia article. A list of location ambiguous words is generated by dictionary sub module 301c and stored in other data set 340. For example, the common English word "hope" is easily confused with a text discussing Hope, Arkansas. Dictionary sub module 301d is configured to obtain activities either through a query to a user for example or from any other source of information including enumerated activities data set 440 or any online dictionaries for example. The activities are augmented with modifiers and facets related to the activities by dictionary sub module 301d and the activities, facets and modifiers are enumerated with synonyms and related terms to generate activity data set 330. For example, "snorkeling" is an activity; variations on the term (for example, "snorkel", or british "snorkelling") may be included as synonyms; modifiers may include the kinds of aquatic features one might see, such as species of fish, ship wrecks, etc. Facets are attributes of instances of activities, for example, accessibility (eg "open to the public"), age level (eg "kid friendly"), or cost (eg, "free"). The result of the development of the dictionary of locations and activities provides the scope of search that is provided by embodiments of the invention. For example, a user of the system may search on any combination of location, activities, location data, and activity facets or modifiers, in order to find information pertaining to these things.

Figure 5:
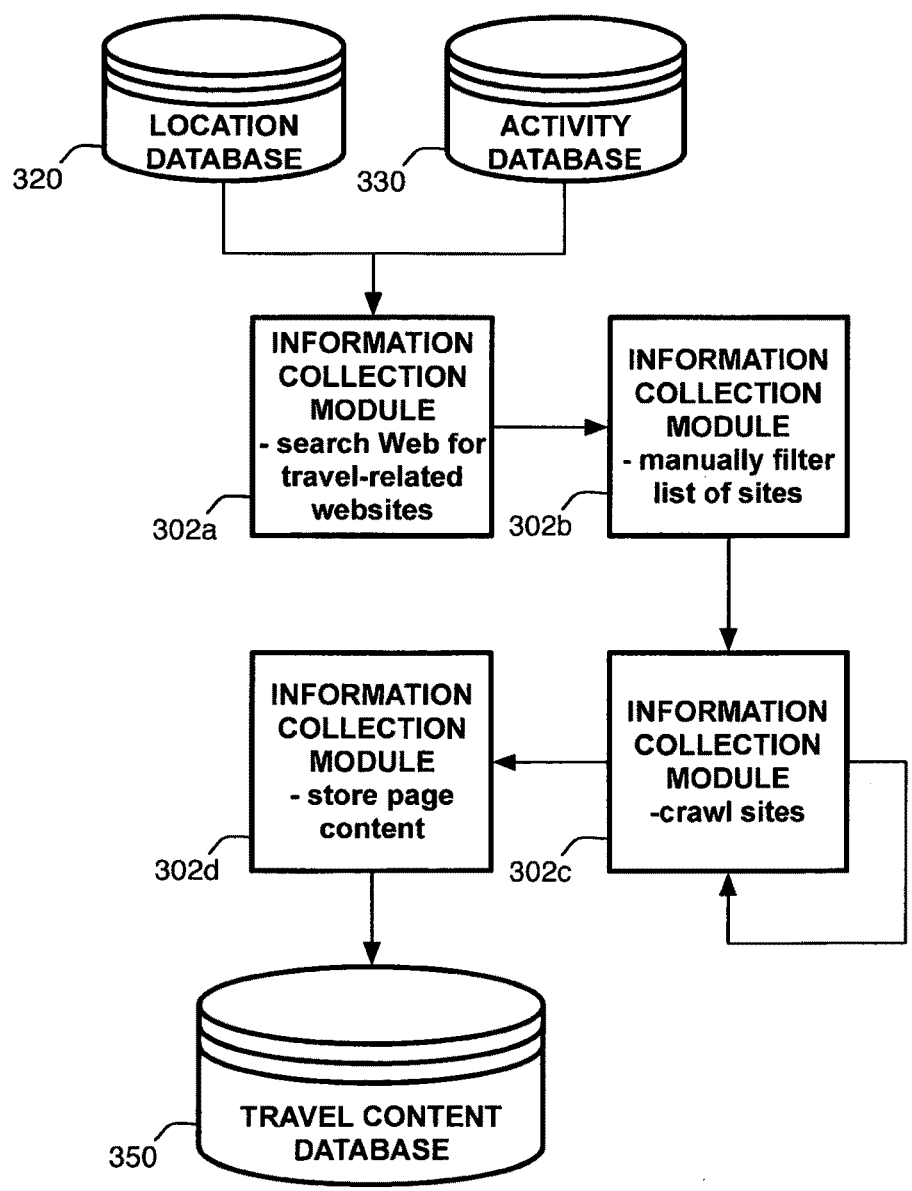
FIG. 5 illustrates the data flow of the information collection module of FIG. 3.

FIG. 5 illustrates the data flow of the information collection module of FIG. 3. The information collection module is configured to gather documents associated with the locations and activities as determined by the dictionary module via information collection sub module 302a. Documents for example may include Internet web pages, blogs, social media web pages, reviews, travel literature, guide books including online versions, corporate, internal, and proprietary content as well or any other information source accessible via computer system 100. One implementation of an embodiment of the information collection module is configured to utilize standard search engines to find candidate Internet web pages hosted on Internet 160 that are related to the locations and activities. For example, text based queries may be formed via standard search engine query templates such as "{LOC} travel", "{LOC} activities", "{ACTIVITY} vacation". Specifically, queries such as "Hempstead County activities" and "snorkeling vacation" can be formed. Query instances are created from these templates using information in location data set 320 and activity data set 330 and applied to one or more standard Internet search engines to obtain potential document sites. In addition, information collection sub module 302b is configured in one or more embodiments to determine popular travel domain names and/or confirm that the document sites are relevant to travel. The document sites may be optionally curated as necessary to reduce the size of content. The curation is configurable and implementations of one or more embodiments may favor completeness over total cost for example. For example, sites may be removed if they are determined to be in a language that is not supported by the search system, or if they appear to be auto-generated or otherwise constitute "web spam". In addition, though the current system is geographically global in scope, it is possible to filter sites geographically in order to create a geographically targeted system. Information collection sub module 302c is configured in one or more embodiments to web crawl the potential document sites, that are also known as travel domains, and associated web pages to find candidate Internet web pages. Web crawling is well developed in the art. Typically the home page of a site is retrieved, as well as the site's crawling directive file "robots.txt" and sitemap (e.g., "sitemap.xml"). Links are parsed from the home page and sitemaps, and those links are retrieved. Further links are then parsed from these files, and the process is repeated until all pages in the site are retrieved or some other stopping criterion is met. Many implementations of crawlers like this exist, such as the "Nutch" crawler. The candidate Internet web pages may include standard web pages, or may be associated with blogs, reviews or any other source of information previously mentioned and as accessible via computer system 100 for example. The candidate Internet web pages are stored by information collection sub module 302d into travel content data set 350. For example, the last retrieved page content, plus optionally one or more previously retrieved instances, plus meta data concerning the page or crawl state are stored in the data set, indexed by the URL of the page. Page meta data may include, for example, content type and other pertinent http headers retrieved along with the page. Crawl state meta data may include, for example, the time the page was retrieved and the number of failed retrieval attempts.

Figure 6:
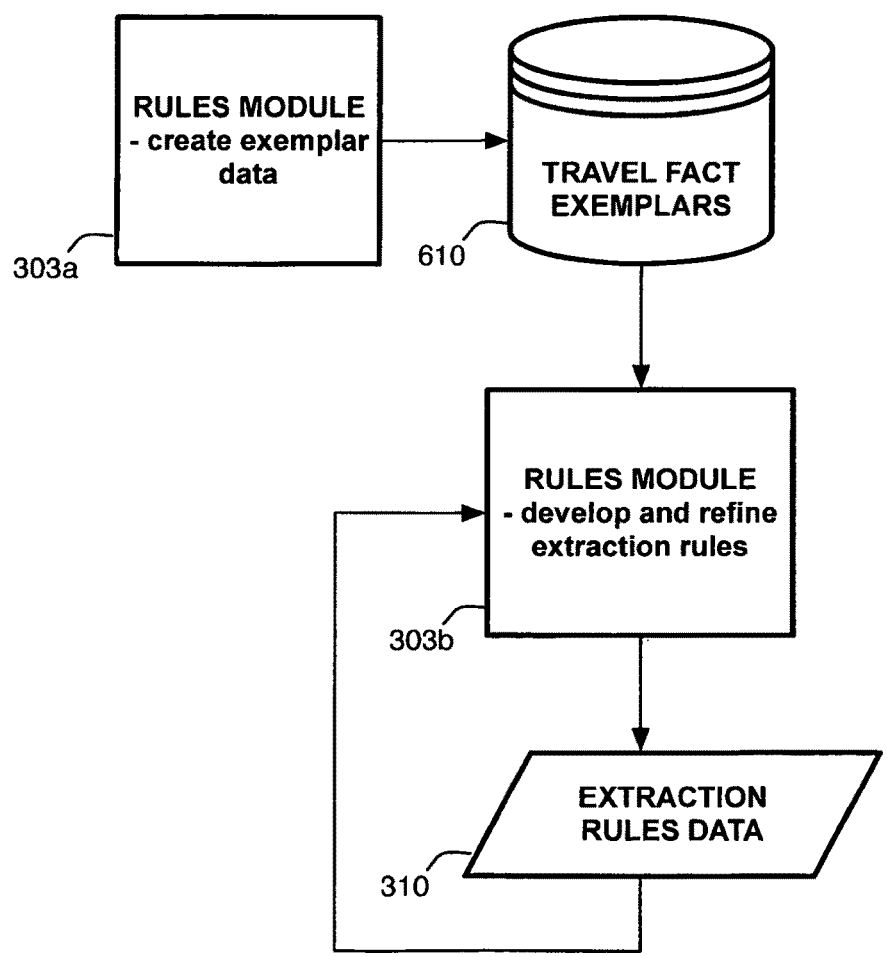
FIG. 6 illustrates the data flow of the rules module of FIG. 3.

FIG. 6 illustrates the data flow of the rules module of FIG. 3. Rules sub module 303a is configured to create exemplar data. This may be implemented with the system querying a user for exemplar data that is then stored in the travel facts exemplars data set 610. Alternatively, the extraction module of FIG. 3 may be employed to populate a trial set of extracted locations, activities, and associations, and users may be asked to assess whether these trial extractions are accurate or not. Both positive and negative examples are stored in the travel facts exemplars data set 610. Rules sub module 303b is configured to develop and refine extraction rules data set 310. Based on the results of the extraction as detailed below in FIG. 7, the extraction rules data set 310 may be modified to provide results tailored to specific criteria. Developing the extraction rules data is an iterative process, involving both a) the manual creation of textual feature detectors and decision procedures, and b) the automatic refinement of decision procedures through evaluation of extraction quality using the travel fact exemplars. Feature detectors include, for example, whether a candidate location is capitalized in text, whether it is confused with common words, and whether geographically related locations or related location content are present nearby. Decision procedures include, for example, numerical predictions of whether a given sequence of terms indicates a location in the database. Automatic refinement includes, for example, machine learning techniques. The art is summarized in "Speech and Language Processing: An Introduction to Natural Language Processing, Computational Linguistics, and Speech Recognition", Daniel Jurafsky & James H Martin, Prentice Hall, 2009.

Figure 7:
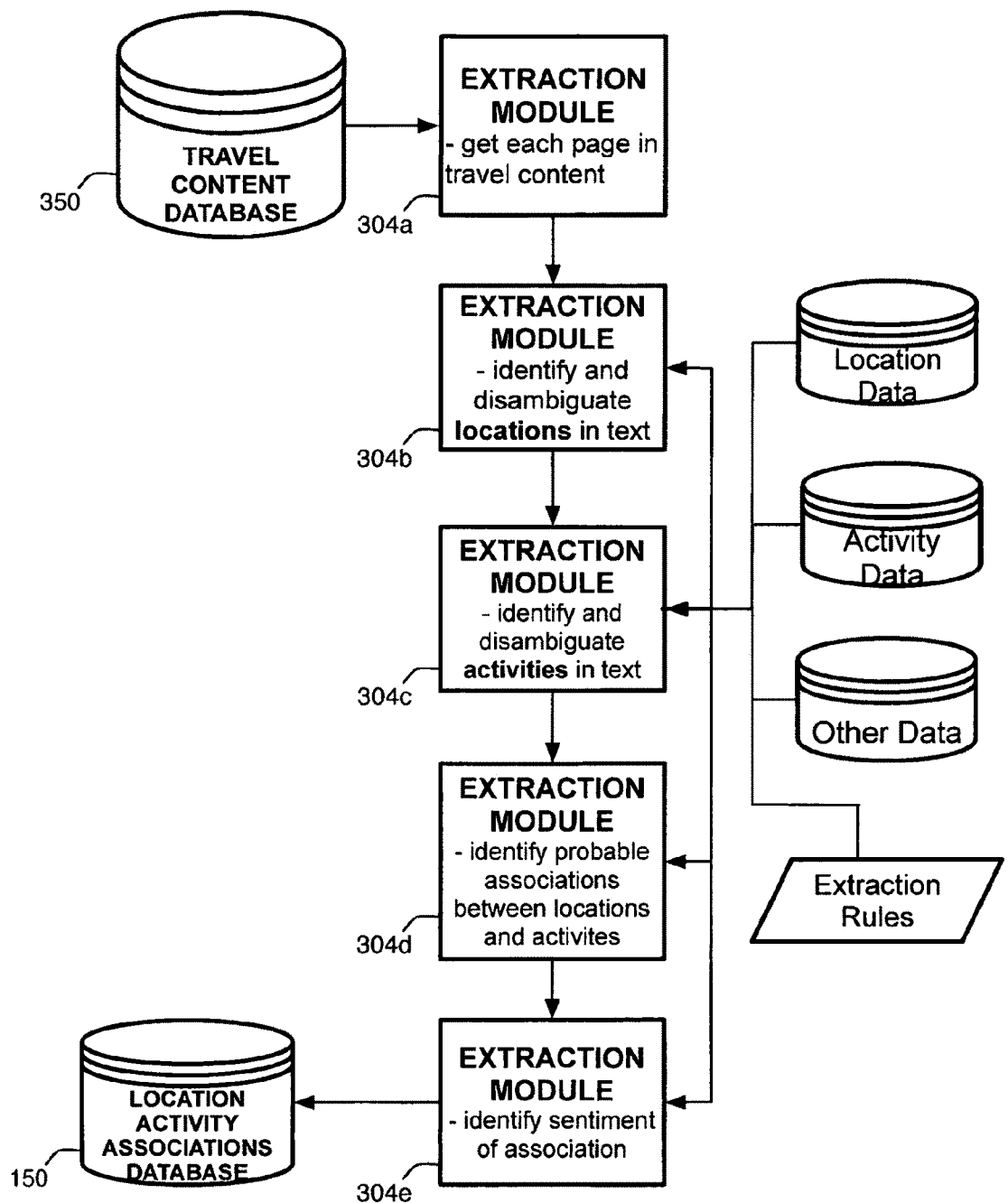
FIG. 7 illustrates the data flow of the extraction module of FIG. 3.

FIG. 7 illustrates the data flow of the extraction module of FIG. 3. The extraction module is configured to extract location and activity associations from the text associated with documents such as the candidate Internet web pages each of which is obtained via extraction sub module 304a from travel content data set 350. Extraction sub modules 304b-e may access data sets 310, 320, 330 and 340 in the extraction process. One or more embodiments of the extraction module for example may identify and disambiguate locations in the text via extraction sub module 304b and disambiguate activities including facets and modifiers in the text via extraction sub module 304c via other data set 340. For example, token "Paris" may be identified in the text, but is ambiguous because multiple locations have the same name (e.g., "Paris, France" and "Paris, Texas"). A variety of evidence is evaluated in the surrounding text in order to disambiguate this reference. Evidence includes, for example, nearby related entity references. The associations may be extracted in one or more embodiments using named entity disambiguation and the location data set, activity data set and synonyms for example. Extraction sub module 304d may also identify probable associations between the locations and activities based on sentence structure, verb connectors and page structure. For example, locations or activities found in page regions such as title, meta tags, and headers can predict an overall location or activity context for the page or supporting regions. In addition, activities and locations found in the same sentence or certain html tag regions (for example, <td>) tend to be associated. As a further example, proximity of activity and location terms to connector words (for example, "near", as in "{ACTIVITY} near {LOC}") can strongly predict association. Extraction sub module 304e may also identify the sentiment of the association, i.e., neutral, degrees of positive or negative opinion. For example, the activity "snorkeling" in a sentence context containing "awesome" suggests a positive opinion of snorkeling in that association. Extraction sub module 304e may also configured to populate the location activity association database 150 and store each association in the database indexed by location, activity and page web domain for example. The extraction module may also optionally be configured to calculate summary statistics such as measures of aggregate association between locations and activities. For example, the frequency of association between each location and each activity may be determined by counting the number of association instances for each unique pair of locations and activities in the database. The extraction module may utilize standard Online Analytical Processing for this purpose.

Figure 8:
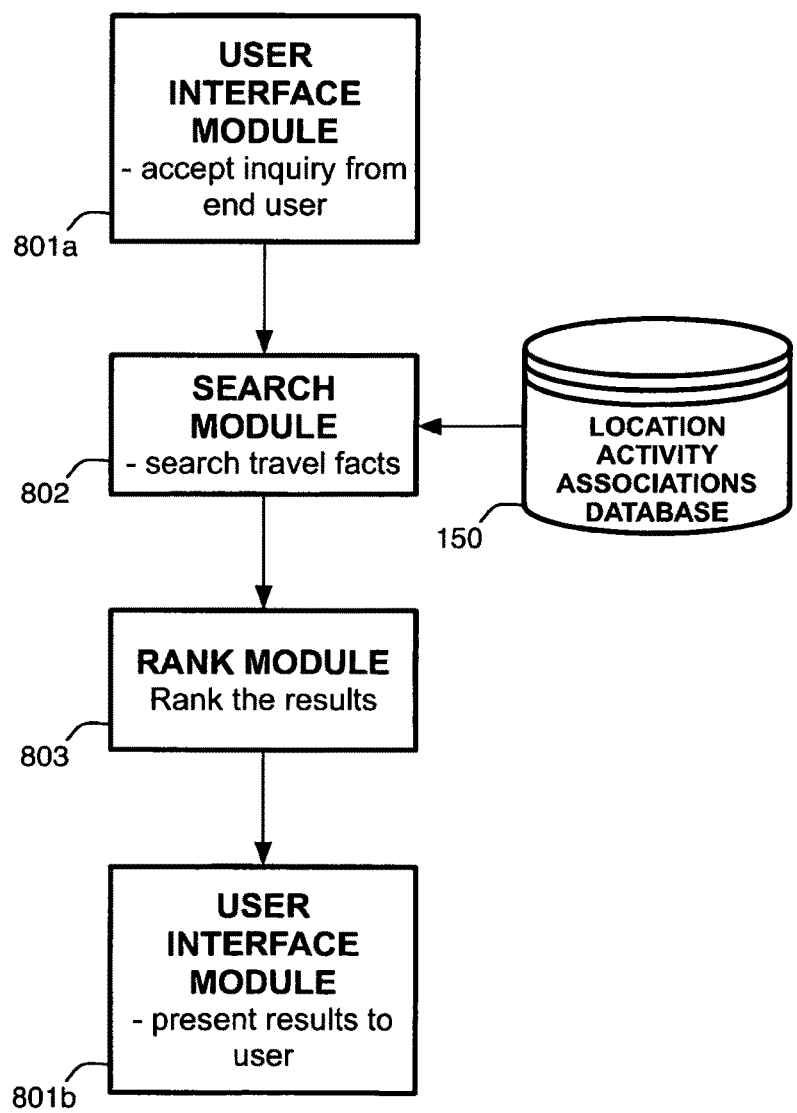
FIG. 8 illustrates the data flow of the user interface, search and rank modules of FIG. 2.

FIG. 8 illustrates the data flow of the user interface, search and rank modules of FIG. 3. The access of the database is performed via program code associated with a user interface module, search module and rank module. The search and rank modules may be implemented separately or in a combined manner. These modules are implemented with program code that executes on the computer associated with the database in one or more embodiments of the system.

User interface sub module 801a is configured to present a search user interface to a user and retrieve a query from the user. For example, an interface element having one or more location and/or activity text fields or menu lists may be presented to the user. Optionally, location data, modifiers and/or facets may be presented for user selection as well. For example, a user may type "snorkeling" on a keyboard, and select "warm" and "February" from user interface options, in order to request recommendations on locations that have good snorkeling and that are warm in February. Optionally, the location may be inferred from the user's current physical location, if the user is utilizing a GPS-enabled or other location-sensitive device or network. Optionally, the system may perform a useful service with no input from the user at all, finding activities that are relevant to the user's current location. Optionally, the user may enter multiple locations, such as an itinerary, and the system can identify activities along the course of a trip, for example while driving.

Search module 802 is configured to search the location activity associations database 150 for any locations entered or any activities entered. If for example a large geographic area is selected by the user, e.g., "California", then the search module finds locations within the large geographic area that are associated with the activities, i.e., "La Jolla", "Del Mar", etc. If the location selected or entered by the user is a fine grained location, then the activities inquired about are searched for in association with that location. If the user enters no locations, then a search is conducted by the search module for locations having associations with the desired activities. If the user enters no activities, then for each location obtained from the user, if the location is a large geographic area, then a search is conducted by the search module for activities in the large region to find locations within that large region where the activities may occur. If the location is a fine grained location, then activities associated with that location are searched for. Example user search queries may include "Buddhist monasteries, warm in January" or "snorkeling with sea turtles". Aspects of the query may or may not be entered in natural language and may instead be selected, for example, from options in a pull down list, hierarchy, or other suitable means of selection.

Rank module 803 is configured to rank the association results that are found by search module 802. The results may be ranked based on any desired factors such as frequency of association, i.e., the number of different times the association was found in the text), domain frequency of the association (the number of different domains where the association was found), aggregate sentiment of the association (neutral, positive/negative sentiment related to the association as determined by the text), overall frequency and domain frequency of the location and activity in the association. In one or more embodiments, based on the desired factors, different rankings may be produced such as popular associations (most frequent and positive associations) and fringe associations (highly positive associations that are infrequent). For example, various locations on Hawaii are frequently and positively associated with snorkeling; alternatively, "Roatan Honduras" is far less frequently mentioned overall, yet has a very positive association with snorkeling and may therefore be considered a good "fringe" location. The ranking of matching associations may entail computation of various measures of relevance such as mutual information for example. In addition, the ranking of the matching associations may entail learning an optimal or user based ranking that is based on user or expert feedback for example.

User interface sub module 801b is configured to present the ranked list of the associations to the user, for example via a graphical user interface having a search user interface element. The search interface element may be implemented as a map, table or list for example or with any other user interface element capable of displaying the associations to the user. In one or more embodiments, the activities may be displayed as icons on the map, and/or with a list of locations and activities with specific text from which the association was extracted, with a hyperlink to the original content where the association was extracted. The modules may execute again if the search is to be refined wherein sub module 801a is executed.

FIG. 9 illustrates an embodiment of a web page and blog containing locations and activities. This web page and blog is an example of the type of content that may be utilized by information collection module 302a-d to fill travel content database 350, as per FIG. 5. The date of the blog is shown at the top of the blog, along with the title "Pigeon Cay . . . ", a blog picture entry follows, which is a snapshot of the web site referenced by the blog, shown as a picture below the title, and a brief blog text entry "Coastal Living Magazine has included Pigeon Cay in its list of top ten spots to snorkel! . . . Paya Bay Resort, Roatan, Honduras".

FIG. 10A illustrates an embodiment of the location data set that may form a portion of location database 320 that may be created by dictionary module 301a-b for example, as per FIG. 4. The location data set may be implemented as a table as shown having one entry for each orthographic form of each location synonym. The record ID forms a unique key for each record, the location lemma ID forms a unique identifier associated with each location, the synonym field shows synonyms for the location, the capsHomographs shows one or more capitalized words (for example, a person's name), if such exists in the language, that may be confused with the synonym, the nameType shows the source and type of character set generally associated with the location name, the wikiExact is true if this synonym serves as the exact title of a wikipedia page for this location, the capsFreq shows an approximate log inverse frequency of the most frequent capsHomograph, the commonFreq shows an approximate log inverse frequency of the most frequent commonHomograph, the commonHomographs shows one or more lower case words (for example, common words found in a dictionary), if such exists in the language, that may be confused with the synonym, while the wikiTitle shows the title of the location as shown on the wikipedia website, if it exists.

FIG. 10B illustrates three location lemmas associated with the location data set, which may form a portion of location data set 320 for example. The three example word forms shown are for Paris (France), Paris (Texas), and Hope (Arkansas). The fclass is shown as a "P" meaning "place" (alternatives include "A" for "administrative region", etc, see geonames.org), along with the name of the location as known within the wikipedia website, the timezone of the location, alternative names associated with the location, along with the latitutude, longitude, population, country, etc.

Figure 11A:
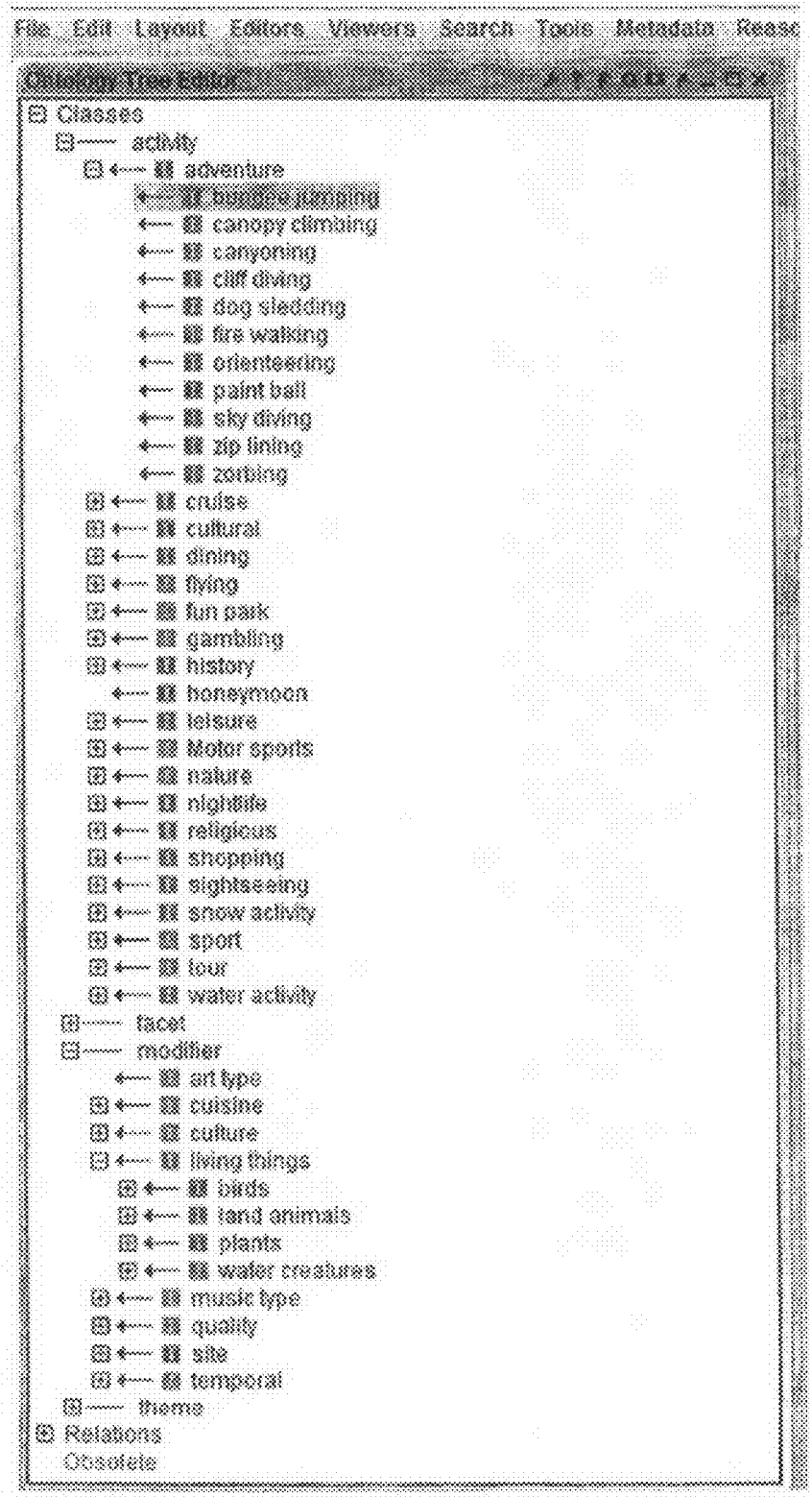
FIGS. 11A and 11B (collectively "FIG. 11") illustrate an embodiment of the activity data set.
Figure 11B:
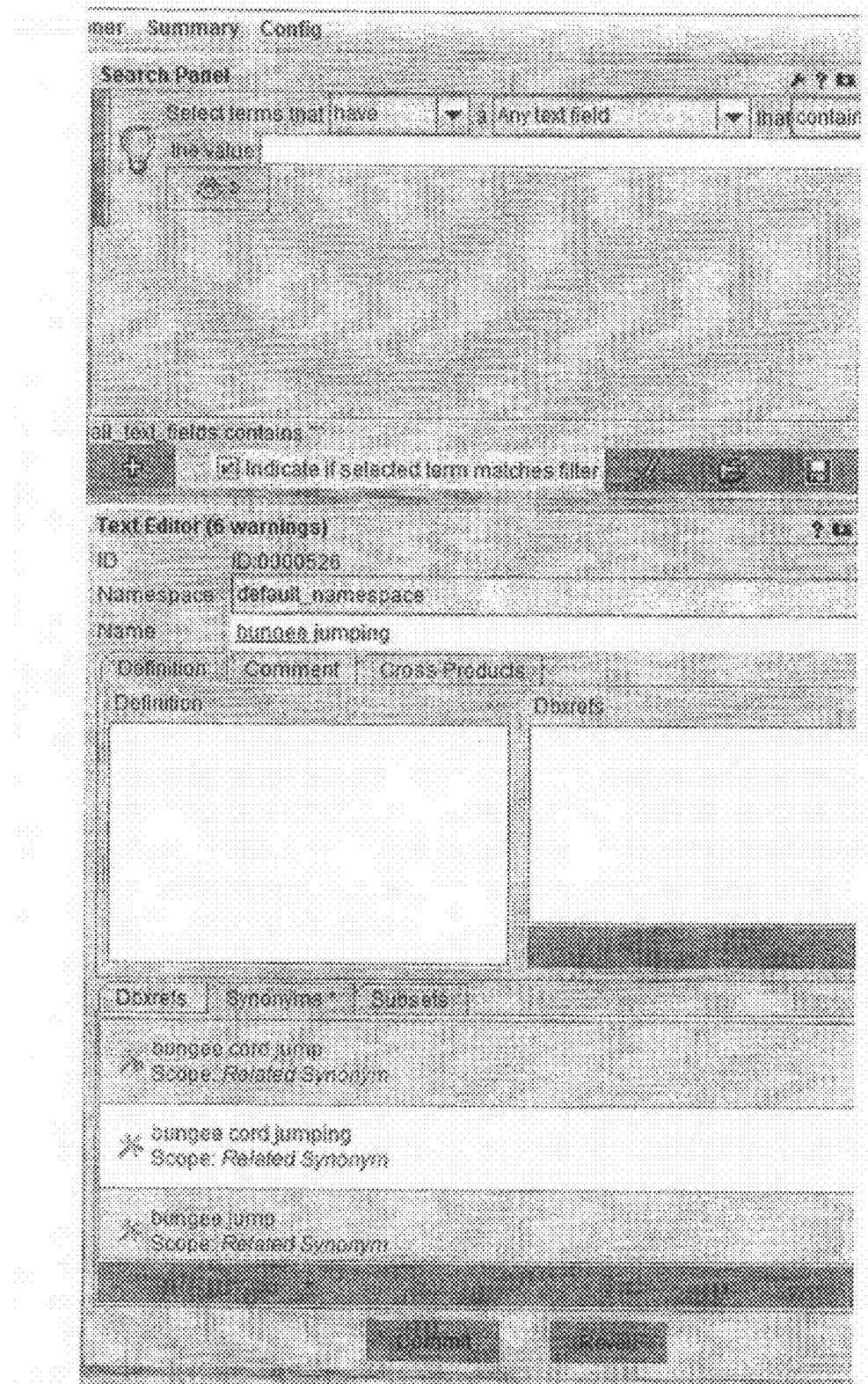

FIG. 11 illustrates an embodiment of the activity data set that may form a portion of activity database 330, wherein the activity data is displayed in a graphical user interface to allow for data entry of the various activities and synonyms that may be entered into the database via dictionary module 301d as per FIG. 4. Under the adventure activity type is shown "bungee jumping", "canopy climbing", "canyoning", "cliff diving", etc. In addition, the facet class is shown in a contracted "+" icon, while the "modifiers" such as "art type", "cuisine", "culture", "living things", with sub-types "birds", "land animals", "plants", "water creatures", etc., are shown. This activity data set screen allows for entry of database cross references, synonyms and subsets.

FIG. 12 illustrates an embodiment of the other data set that may form a portion of other database 340, wherein the other data may be generated by dictionary module 301c as per FIG.

4. Common terms are shown in the top records with the synonym and frequency of the synonym also shown. The non-geo terms that orthographically overlap the location terms are shown in the second table with synonym and the "Wiki ID", which is the exact title as found in wikipedia if the non-geo term was found there.

FIG. 13 illustrates an embodiment of the travel content data set that may form a portion of travel content database 350 for example as shown in FIG. 3. For each URL in the leftmost column as shown that was successfully fetched (LastOK !=empty), the full fetched data (along with zero or more archived previous instances of the fetched data) is stored in a zip file indexed by the URL string. In addition, the domain name of the site, last date of a failed attempt at crawling the page, last successful date of a crawl of the page, minimum number of links crawled to reach this page from the root of the site, content-type of the page (as declared by the site web server), and character set of the page are shown as columns in the figure.

An embodiment of extraction rules data set that may form a portion of extraction rules data 310 as shown in FIG. 3 may be implemented as an XML file as follows. Any type or methodology may be utilized to implement extraction rules. For example any rules that implement capabilities in the art of information extraction, as explicated in "Speech and Language Processing", Daniel Jurafsky and James H. Martin, Prentice Hall 2009 may be utilized. Embodiment of the extraction rules for example may utilize a sequence of text analytic processes applied to each page of text. Each process annotates the text with relevant regions and/or identifies features or evidence of the regions that are predictive of their semantic interpretation. Rules also may combine regions and evidence to create additional regions and/or evidence. Numeric weights and confidences may be associated with rules, regions, and interpretations. The rule set may be implemented in one or more embodiments with a high level language that combines features of: dictionary lookup, regular expressions with non-regular embedded functions, call-out functions implemented in one or more programming languages such as the Java language, domain data types, and disambiguation via weighted evidence combination. The rules are text editable, or editable via any available XML browser for example and allow for the definition of data and objects to operate upon the data. An embodiment shown below for example defines standard synonym dictionaries and objects utilized to operate on them, along with non-geographical dictionary terms, concepts, images, geo/activity pairs, and the objects to operate upon them as follows:

```
<defs reflags="x">
    <defs>
        <function name="termToConcepts"
            class="com.notiora.ted.matchfunc.util.TermToConcepts"/>
        <!-- Standard synonyms -->
        <matcher name="dict.travsyn" bean="travsynDict"/>
        <matchkey key="travsyn.term" wrap="false"> dict.travsyn.term </matchkey>
        <!-- Dictionaries -->
        <matcher name= "dict.travel" bean="travelDict"/>
        <matcher name= "dict.geopred" bean="geopredDict"/>
        <matcher name= "dict.geocommon" bean="geoCommonDictSingle"/>
        <matcher name= "dict.geo" bean="geoDictSimpleTerm"/>
        <matcher name= "dict.nongeo" bean="nonGeoDict"/>
        <!-- Score non-geo dictionary terms -->
        <matcher bean="nongeoTermScoreMatcher" name="nongeo" keys="dict.nongeo.term"
                termKey= "syn" wtPfx="nongeo."/>
        <matcher bean="geocommonTermScoreMatcher" name= "geocommon"
                keys="dict.geocommon.term" termKey="syn" freqKey="freq" wtPfx="geocommon."/>
        <matcher bean="geopredTermScoreMatcher" name="geopred" keys="dict.geopred.term"
                termKey="wikiTitle" wtPfx="geopred."/>
        <matcher bean="travelTermScoreMatcher" name="travel" termKey="syn" wtPfx="travel."
                keys="dict.travel.term"/>
        <!-- Promote Geos to concept where sufficient evidence -->
        <matcher bean="geoTermToConceptsMatcher" filter="false" name="t2c" key="geo.concept"
                keys="dict.geo.term"/>
        <matcher bean="geoPredToConceptsMatcher" name="p2c" key="geo.concept"
                keys="dict.geopred.term"/>
        <matcher bean="geoConceptScoreMatcher" name="csc" keys="geo.concept"/>
        <!-- typedefs -->
        <typedef key="geo.concept"> <prop key="geolocuid" type="Integer" dictBean="geoDict"/>
                </typedef>
        <typedef key="travel.concept"> <prop key="oboid" type="String" dictBean="travelDict"/>
                </typedef>
        <typedef key="geocommon.concept"> <prop key="syn" type="String"/> </typedef>
        <typedef key="nongeo.concept"> <prop key="syn" type="String"/> </typedef>
        <!-- Pick top concepts -->
        <matchkey key="geocommon.concept" wrap="false"> dict.geocommon.term </matchkey>
        <matchkey key="nongeo.concept" wrap="false"> dict.nongeo.term </matchkey>
        <template key="travel.concept" substrings="true" allmatches="true" mergedup="false">
                $(dict.travel.term) (?{ toexport=termToConcepts(matches[0]) }) </template>
        <matcher bean="keepBestMatcher" key="top.phrases" storePfx="top."
            keys="geocommon.concept, geo.concept, nongeo.concept, travel.concept"/>
        <!-- images -->
        <matcher bean="standardImageScoreMatcher" key="img.candidate" keys="html.img"/>
        <!-- find geo / activity pairs -->
        <matchkey key="top.travel.concept.term.activity" wrap="false"> top.travel.concept[
                type="activity" ] </matchkey>
        <matchkey key="top.travel.concept.term.none" wrap="false"> top.travel.concept[
                type="none" ] </matchkey>
```

```
    <matchkey key="top.travel.concept.term.quality" wrap="false"> top.travel.concept[
        type="quality" ] </matchkey>
    <matcher bean="associatedPairsMatcher" key="travel.fact.candidate" proximityChars="150"
        matchChars="300"
      pairKeys="top.geo.concept, top.travel.concept.term.activity" pairAttrs="geoloc, activity"/>
    <template name="fact.options" within="travel.fact.candidate"> (?{
        within.quality = unwrap(allMatches("top.travel.concept.term.quality")) ;
        within.image = unwrap(allMatches("img.candidate")) ;
        within.none = unwrap(allMatches("top.travel.concept.term.none")) ;
        true})
    </template>
    <matcher bean="featureCountScoreMatcher" key="travel.fact.scored"
        keys="travel.fact.candidate"
        optCount="1" features="geoloc,activity,quality,image"/>
    <matchkey key="travel.fact" wrap="false"> travel.fact.scored </matchkey>
  </defs>
</defs>
```

FIG. 15 illustrates an embodiment of the location activity association database that may form a portion of location activity associations database 150 as shown in FIG. 3. Each location/activity association is a single activity and single location extracted from a snippet of text (from a page), along with optional image, modifiers, and sentiment. In addition to the data shown in the figure, other information such as the date the page was fetched, the date information was extracted, html tags or markup in the snippet, and confidence score for each extraction may also be stored.

FIG. 16 illustrates an embodiment of the travel fact exemplars database that may form a portion of travel fact exemplars 610 as shown in FIG. 6. Each travel fact exemplar is a snippet of text from a page, along with human editor assessments of the validity of all or a subset of key extractions: act/loc associations, activities, locations, images, modifiers, and sentiments. In addition to the data shown here, other information such as the date of assessment, html tags or markup in the snippet, contextually relevant other regions of the page (for example, the page title), contextually relevant other content (for example, the text associated with hyperlinks that refer to the page), or the identity of the editor may also be stored. In the table, + indicates the extraction is valid, – indicates the extraction is incorrect.

Figure 17A:
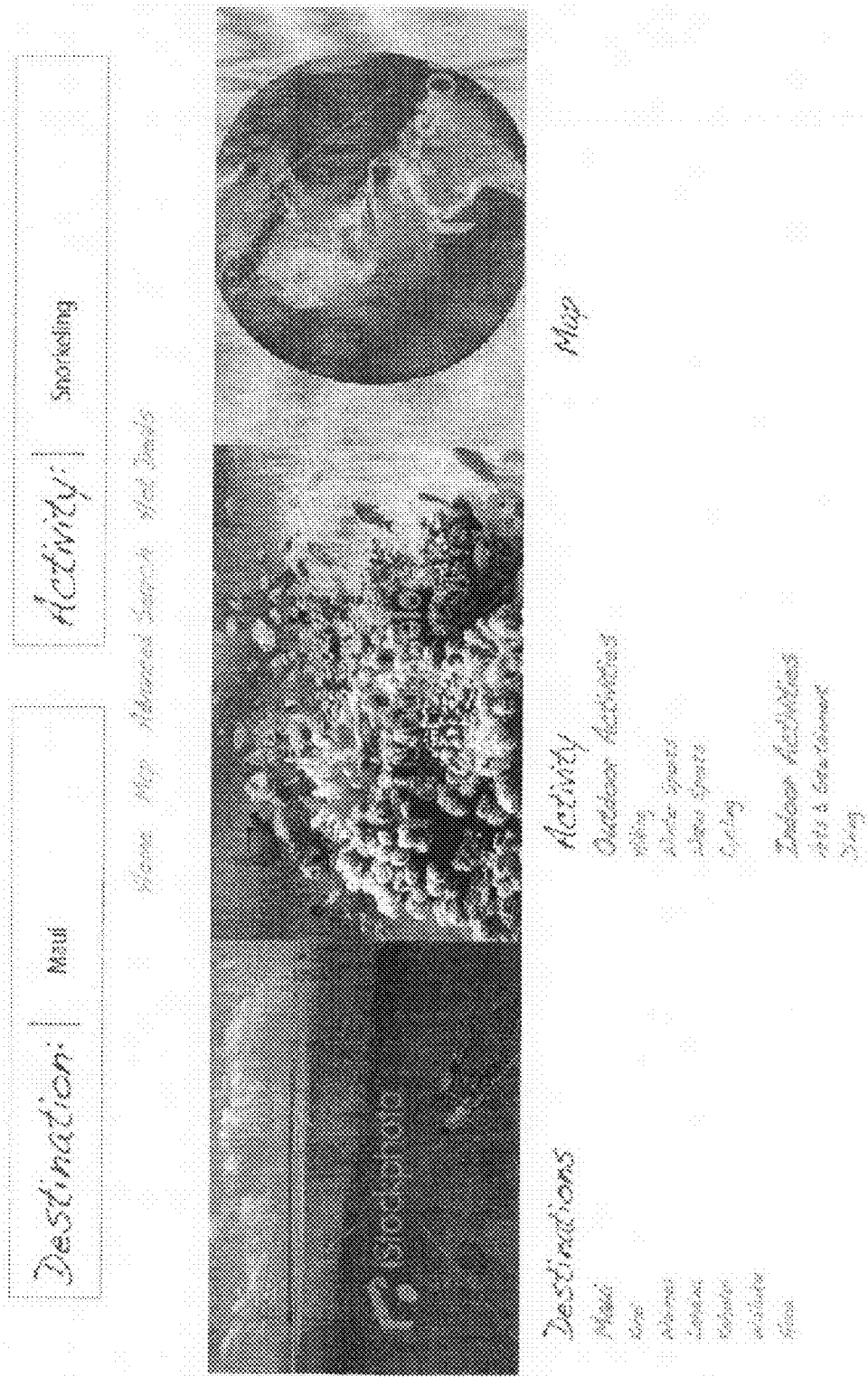
FIGS. 17A and 17B (collectively "FIG. 17") illustrate an embodiment of the user interface configured to obtain queries from a user and present results of the search and rank modules to the user.
Figure 17B:

FIG. 17 illustrates an embodiment of the user interface that may form a portion of user interface module 801a, search module 802, rank module 803, and user interface module 801b as shown in FIG. 8. The user interface may be configured to obtain queries from a user and present results of the search and rank modules to the user. The top screen is an example of an initial page, where the user starts his or her search. The user may type in one or more locations or activities, or may select activities or locations from a hierarchically organized set of options. The bottom screen as shown is an example of a result page, in which a map of a relevant set of locations is presented along with icons indicating the type of activity, any other type of user interface element that allows for searches on locations and activities and present results may be utilized, including but not limited to web pages, or mobile phone applications, or any other type of interface element that allows for input of data and the presentation of data to a user. The location may be typed in the user for example, or may be populated automatically via a GPS, wireless triangulation, IP address determination, cell phone triangulation or any other location determination technique capable of determining a current location of a user.

While the ideas herein disclosed has been described by means of specific embodiments and applications thereof, numerous modifications and variations could be made thereto by those skilled in the art without departing from the scope of the invention set forth in the claims.

What is claimed is:

1. A search engine computer system comprising:
   computer hardware that is coupled to a database and which includes program code in the form of modules;
   wherein a dictionary module is configured to
       obtain a data set of identifiers for at least one geographical location from at least one of a first plurality of sources;
       obtain a data set of activity identifiers for at least one activity from at least one of a plurality of sources;
       wherein the data sets of locations and activities provide the scope of a search;
   wherein an information collection module is configured to: gather at least a portion of at least one document associated with
       (a) an identifier from the data set of identifiers for at least one geographical location and
       (b) an identifier from the data set of activity identifiers for at least one activity, said at least one document being selected from the group consisting essentially of internet web pages, blogs, social media web pages, online reviews, online travel literature, online guide books, and corporate, personal and proprietary documents that are accessible via the internet;
   wherein a rules module is configured to create exemplary data;
   wherein an extraction module is configured to:
       extract from text associated with the at least one document at least one association between the geographic location(s) and activity(ies), and the sentiment of said at least one association from the at least one document;
       populate the database with the location(s), activity(ies), and said at least one association;
       store each of said at least one association in the database indexed by location and activity;
   wherein a user interface module is configured to provide user interaction through the presentation of a search interface for receiving a query;
   wherein a search module is configured to search the database for the location(s), activity(ies), and association(s) results associated with the query;
   wherein a rank module is configured to rank the association results of the search; and wherein the user interface module is further configured to present to a user a ranked list of destinations associated with an activity and a ranked list of activities associated with a destination,
  wherein the ranked lists are summarized from a list of the association(s) results.

2. The computer system of claim 1 wherein one of said at least a portion of at least one document is a portion of a natural language document and wherein the extraction module utilizes text recognition of the identifiers of the geographic location(s) and activity(ies) to identify the associations between the location(s) and activity(ies).

3. The computer system of claim 2 wherein the extraction module further utilizes Named Entity Disambiguation to identify the associations between the location(s) and activity(ies).

4. The computer system of claim 3 wherein the extraction module further utilizes linguistic and structural clues to identify the associations between the location(s) and activity(ies).

5. The computer system of claim 4 wherein the information collection sub-module utilizes standard search engines to find the at least one document.

6. The computer system of claim 4 wherein the information collection sub-module utilizes web-crawlers to find the at least one document.

7. The computer system of claim 4 wherein the extraction sub-module is further configured to disambiguate locations and activities in said at least one document.

8. The computer system of claim 4 wherein the extraction module is further configured to identify the association(s) based on the sentence structure, the verb connectors or the structure of the at least one document.

9. The computer system of claim 4 wherein the extraction module, while populating the database, produces a population of the association(s) that is indexed by the associated location(s), activity(ies), or source.

10. The computer system of claim 9 wherein the extraction module is further configured to calculate summary statistics.

11. The computer system of claim 1 wherein the extraction module, while populating the database, produces a population of the association(s) that is indexed by the associated location(s), activity(ies), or source.

12. A location activity search engine computer system comprising:
  a database configured to hold location activity associations;
  at least one computer coupled with said database;
  a network coupled with said at least one computer;
  a location data set;
  an activity data set;
  a travel content data set;
  an extraction rules data set;
  an information collection module defined by program code configured to execute on said at least one computer wherein said information collection module is configured to
    gather a plurality of documents that contain textual statements about locations and activities,
    store said plurality of documents in said travel content data set;
  wherein said documents are selected from the group consisting essentially of any of either Internet web pages, blogs, social media web pages, online reviews, online travel literature, online guide books, and corporate, personal and proprietary documents that are accessible via the internet;
  an extraction module defined by program code configured to execute on said at least one computer wherein said extraction module is configured to
    utilize said location data set and said activity data set to extract associations between a first location and a first activity from said plurality of documents based on said extraction rules data set;
    identify sentiment of an association between said locations and said activities, and
    disambiguate said sentiment of an association between said locations and said activities, and
    store said associations in said database;
  a user interface module defined by program code configured to execute on said at least one computer wherein said user interface module is configured to
    present a search user interface element to a user;
    retrieve a search query from said search user interface element wherein said search query comprises any combination of at least one of an activity input from a user, a current location of said user or a location input from said user;
  a search module defined by program code configured to execute on said at least one computer wherein said search module is configured to search said location activity associations database with said search query to produce associations results;
  a rank module defined by program code configured to:
    execute on said at least one computer wherein said rank module is configured to rank said association results and,
    produce a ranked list of associations in said association results, wherein the ranked list produces rankings through use of fringe associations that include associations that are infrequent;
  said user interface module further configured to present said ranked list of associations on said search user interface element.

13. The location activity search engine computer system of claim 12 wherein said location data set is further configured to contain synonyms of locations.

14. The location activity search engine computer system of claim 12 wherein said location data set is further configured to contain related points of interest and other locations with respect to said locations.

15. The location activity search engine computer system of claim 12 wherein said activity data set is further configured to contain synonyms, modifiers and facets related to said activities.

16. The location activity search engine computer system of claim 12 wherein said information collection module is further configured to use a search engine with said locations and said activities from said location data set and activity data set respectively to gather seed sites or pages for some of said plurality of documents.

17. The location activity search engine computer system of claim 12 wherein said information collection module is further configured to curate travel domain names.

18. The location activity search engine computer system of claim 12 wherein said information collection module is further configured to use travel websites or blogs to gather said plurality of documents.

19. The location activity search engine computer system of claim 12 wherein said extraction module is further configured to identify and disambiguate locations and disambiguate activities in said plurality of documents.

20. The location activity search engine computer system of claim 12 wherein said extraction module is further configured to identify probable associations between locations and activities based on sentence structure, verb connectors or page structure.

21. The location activity search engine computer system of claim 12 wherein said search module is further configured to search for specific locations associated with said locations if said locations are regions.

22. The location activity search engine computer system of claim 12 wherein said rank module is further configured to:
   determine a frequency of the associations in said association results;
   rank said association results through use of frequency of association that includes the number of times an association was found.

23. The location activity search engine computer system of claim 12 wherein said rank module is further configured to rank said association results through use of domain frequency of association that includes the number of different domains that an association was found.

24. The location activity search engine computer system of claim 12 wherein said rank module is further configured to rank said association results through use of an aggregate sentiment of the association;
   wherein the sentiment is extracted from a document and the sentiment is aggregated across all associations for a given location and activity pair.

25. The location activity search engine computer system of claim 12 wherein said rank module is further configured to rank said association results through use of an overall frequency and domain frequency of the activity and location in the association.

26. The location activity search engine computer system of claim 12 wherein said rank module is further configured to produce rankings through use of popular associations that include the most frequent and positive associations.

27. The location activity search engine computer system of claim 12 wherein said activity data set comprises activity facets.

28. The location activity search engine computer system of claim 12 wherein said user interface module displays information with a map.

* * * * *